United States Patent
Li et al.

(10) Patent No.: US 9,007,313 B2
(45) Date of Patent: Apr. 14, 2015

(54) TOUCH SENSING CIRCUIT AND TOUCH POINT DETECTING METHOD THEREOF

(75) Inventors: Yi-Kun Li, Hsinchu (TW); Jui-Jung Chiu, Zhudong Township, Hsinchu County (TW)

(73) Assignee: TPK Touch Solutions Inc., Taipei (TW)

(*) Notice: Subject to any disclaimer, the term of this patent is extended or adjusted under 35 U.S.C. 154(b) by 335 days.

(21) Appl. No.: 13/488,361

(22) Filed: Jun. 4, 2012

(65) Prior Publication Data

US 2013/0015907 A1    Jan. 17, 2013

(30) Foreign Application Priority Data

Jul. 12, 2011    (CN) .......................... 2011 1 0194620

(51) Int. Cl.
*H03K 17/96*    (2006.01)
*G06F 3/041*    (2006.01)
*G06F 3/044*    (2006.01)

(52) U.S. Cl.
CPC .............. *G06F 3/0416* (2013.01); *G06F 3/044* (2013.01)

(58) Field of Classification Search
CPC ................................ G06F 3/0416; G06F 3/044
USPC .................................................. 345/173–179
See application file for complete search history.

(56) References Cited

U.S. PATENT DOCUMENTS

2007/0268272 A1*  11/2007  Perski et al. ................... 345/173
2011/0031042 A1*  2/2011   Wu et al. ..................... 178/18.06

FOREIGN PATENT DOCUMENTS

TW         201011620 A1    3/2010
TW         201019197 A1    5/2010

* cited by examiner

*Primary Examiner* — Amare Mengistu
*Assistant Examiner* — Jennifer Zubajlo
(74) *Attorney, Agent, or Firm* — Gokalp Bayramoglu

(57) ABSTRACT

A touch sensing circuit includes an alternative current (AC) source, a voltage division circuit, and a processing circuit. The voltage division circuit receives an AC signal outputted from the AC source and includes a first branch and a second branch on a touch sensing glass, wherein the first and second branches are adjacent to each other. The processing circuit is connected to the voltage division circuit for determining position of a touch point according to the voltages of the first branch and the second branch. In a preferred embodiment, the first branch comprises a first capacitor and a first voltage division resistor connected to the first capacitor, and the second branch comprises a second capacitor and a second voltage division resistor connected to the second capacitor.

18 Claims, 4 Drawing Sheets

TOUCH SENSING CIRCUIT AND TOUCH POINT DETECTING METHOD THEREOF

This application claims the benefit of Chinese application No. 201110194620.X, filed on Jul. 12, 2011.

FIELD OF THE INVENTION

The present invention relates to a touch screen, and more particularly to a touch sensing circuit of the touch screen and a touch point detecting method thereof.

BACKGROUND OF THE INVENTION

There are two types of sensing circuits for touch screens: active type and passive type. An active sensing circuit detects touch points based on high frequency radiation and resonance principles. Typically in an active sensing circuit, multiple inductance coils are set in a sensing board and a controlling board selects one of the inductance coils and delivers alternative current to the selected inductance coil. The inductance coil is actuated by the alternative current to generate magnetic field. Thereafter, when an electronic pen is brought close to the magnetic field, resonance circuit of the electronic pen stores electric energy. After the electric energy is stored in the electronic pen, the controlling board stops delivering alternative current to the selected inductance coil. Meanwhile, resonance circuit of the electronic pen transforms the electric energy to signals by free oscillation. The sensing board converts the signals to electric signals to determine the touch point.

A passive sensing circuit, on the other hand, accumulates charges on a sensing board to make the voltage meet the requirement of a successive circuit. Touch point, in such a case, can be detected based on the voltage.

However, there are certain disadvantages of the above described active and passive sensing circuits. As for an active sensing circuit, in order to accurately determine a touch point, sensing board needs high precision inductance coils. Further, because the signals are weak, the successive circuit is complicated, which increases the production cost. As for the passive sensing circuit, the successive circuit needs to wait a long time for processing the voltage, thereby extending the reactive time of the passive sensing circuit. In some cases, supplemental circuits are used to decrease the reactive time of the passive sensing circuit, however, in such cases the production cost is increased.

SUMMARY OF THE INVENTION

It is an object of the present invention to provide an economical and responsive touch sensing circuit of a touch screen.

A touch sensing circuit includes an alternative current (AC) source, a voltage division circuit, and a processing circuit. The voltage division circuit receives an AC signal outputted from the AC source and includes a first branch and a second branch on a touch sensing glass, wherein the first and second branches are adjacent to each other. The processing circuit is connected to the voltage division circuit for determining position of a touch point according to the voltages of the first branch and the second branch.

In a preferred embodiment, the first branch comprises a first capacitor and a first voltage division resistor, which is connected to the first capacitor, and the second branch comprises a second capacitor and a second voltage division resistor, which is connected to the second capacitor.

In a preferred embodiment, each of the first capacitor and the second capacitor are respectively composed by two ITO films of a touch sensing glass, wherein the two ITO films of each capacitor cross over each other and are electrically insulated from each other.

In a preferred embodiment, capacitance of the first capacitor is in direct proportion to distance of a touch point to the first capacitor; capacitance of the second capacitor is in direct proportion to distance of a touch point to the second capacitor.

In a preferred embodiment, a first equalizing resistor and a second equalizing resistor are respectively connected to two terminals of the AC source, wherein resistance of the first equalizing resistor is equal to that of the second equalizing resistor.

In a preferred embodiment, the voltage division circuit further includes a third equalizing resistor and a fourth equalizing resistor connected to two terminals of the first capacitor, a fifth equalizing resistor, and a sixth equalizing resistor connected two terminals of the second capacitor. In another embodiment, resistances of the third equalizing resistor, the fourth equalizing resistor, the fifth equalizing resistor, and the sixth equalizing resistor are the same.

In a preferred embodiment, the voltage division circuit further includes a first equalizing capacitor with one terminal of the first equalizing capacitor connected to one terminal of the first capacitor and other terminal of the first equalizing capacitor grounded, a second equalizing capacitor with one terminal of the second equalizing capacitor connected to the other terminal of the first capacitor and the other terminal of the second equalizing capacitor grounded, a third equalizing capacitor with one terminal of the third equalizing capacitor connected to one terminal of the second capacitor and the other terminal of the third equalizing capacitor grounded, and a fourth equalizing capacitor with one terminal of the fourth equalizing capacitor connected to the other terminal of the second capacitor and the other terminal of the fourth equalizing capacitor grounded, and the capacitances of the first equalizing capacitor, the second equalizing capacitor, the third equalizing capacitor, and the fourth equalizing capacitor are the same.

In a preferred embodiment, the touch sensing circuit further includes a first equalizing resistor and a second equalizing resistor with the same resistance, a third equalizing resistor, a fourth equalizing resistor, a fifth equalizing resistor, and a sixth equalizing resistor with the same resistance, a first equalizing capacitor and a second equalizing capacitor with the same capacitance, a third equalizing capacitor and a fourth equalizing capacitor with the same capacitance. In an embodiment, one terminal of the first equalizing resistor is connected to one terminal of the third equalizing resistor and other terminal of the first equalizing resistor is connected to one terminal of the AC source, other terminal of the AC source is connected to one terminal of the second equalizing resistor, and other terminal of the second equalizing resister is grounded. In another embodiment, other terminal of the third equalizing resistor is connected to one terminal of the first capacitor and other terminal of the first capacitor is connected to one terminal of the fourth equalizing resistor. Other terminal of the fourth equalizing is connected to one terminal of the first voltage division resistor and other terminal of the first voltage division resistor is grounded. Further, one terminal of the first equalizing capacitor is connected to the common terminal of the third equalizing resistor and the first capacitor and other terminal of the first equalizing capacitor is grounded. One terminal of the second equalizing capacitor is connected to the common terminal of the fourth equalizing resistor and the first capacitor and other terminal of the second equalizing capacitor is grounded. One terminal of the fifth equalizing resistor is connected to the common terminal of the first equalizing resistor and the third equalizing resistor and other terminal of the fifth equalizing resistor is connected to one terminal of the second capacitor, wherein other terminal of the second capacitor is connected to one terminal of the sixth equalizing resistor. Other terminal of the sixth equalizing resistor is connected to one terminal of the second voltage division resistor and other terminal of the second voltage division resistor is grounded. Further, one terminal of the third equalizing capacitor is connected to the common terminal of the fifth equalizing resistor and the second capacitor, and the other terminal of the third equalizing capacitor is grounded. One terminal of the fourth equalizing capacitor is connected to the common terminal of the sixth equalizing resistor and the second capacitor, and the other terminal of the fourth equalizing capacitor is grounded.

In a preferred embodiment, the processing circuit includes a differential circuit connected to the voltage division circuit for getting voltages of the first voltage division resistor and the second voltage division resistor, a level adjusting circuit connected to the differential circuit, and an amplifying circuit connected to the level adjusting circuit.

In a preferred embodiment, the processing circuit determines that the touch sensing glass is not touched. The processing circuit can further determine distance of the touch point to the first capacitor is equal to that of the touch point to the second capacitor, when the voltage of the first voltage division resistor is equal to that of the second voltage division resistor. The processing circuit can further determine that distance of the touch point to the first capacitor is less than that of the touch point to the second capacitor, when the voltage of the first voltage division resistor is less than that of the second voltage division resistor. In another embodiment, the processing circuit can further determine that the distance of the touch point to the first capacitor is greater than that of the touch point to the second capacitor, when the voltage of the first voltage division resistor is greater than that of the second voltage division resistor.

In a preferred embodiment, the processing circuit determines an offset of the touch point to the first capacitor or to the second capacitor based on difference of voltage of the first voltage division resistor and that of the second voltage division resistor.

Furthermore, it is another object to provide a touch point detecting method.

A touch point detecting method includes: i) providing an AC signal to a voltage division circuit including a first branch and a second branch, which are adjacent to each other, on a touch sensing glass, ii) picking up voltages of the first branch and the second branch; iii) determining position of touch point based on the voltages of the first branch and the second branch.

In a preferred embodiment, the first branch comprises a first capacitor and a first voltage division resistor, which is connected to the first capacitor and the second branch comprises a second capacitor and a second voltage division resistor, which is connected to the second capacitor. In an embodiment, step ii further comprises a step iv): picking up voltages of the first voltage division resistor and the second voltage division resistor; and step iii) further comprises a step v): determining the position of the touch point based on the voltages of the first voltage division resistor and the second voltage division resistor.

In a preferred embodiment, step v) further comprises a step vi): performing a differential operation on the voltages of the first voltage division resistor and the second voltage division resistor to get differential signals; step vii): adjusting the differential signals to get adjusted signals; step viii): amplifying the adjusted signals.

In a preferred embodiment, step v) further comprises of step ix): determining that the touch sensing glass is not touched or distance of the touch point to the first capacitor is equal to the distance of the touch point to the second capacitor when the voltage of the first voltage division resistor is equal to the voltage of the second voltage division resistor; step x): determining that the distance of the touch point to the first capacitor is less than the distance of the touch point to the second capacitor, when the voltage of the first voltage division resistor is less than the voltage of the second voltage division resistor; step xi): determining that the distance of the touch point to the first capacitor is greater than the distance of the touch point to the second capacitor, when the voltage of the first voltage division resistor is greater than the voltage of the second voltage division resistor.

In a preferred embodiment, step v) further comprises of step xii): determining offset of the touch point to the first capacitor or to the second capacitor based on difference of voltage of the first voltage division resistor and the voltage of the second voltage division resistor.

By using the aforementioned touch point detecting method of the touch sensing circuit of the touch screen, when a user's finger touches the touch sensing glass of the touch screen, the touch attracts charges and changes capacitance of the capacitor. Because the capacitance of the capacitor is directly proportional to the distance of the capacitor from to the touch point, the touch point can be determined according to the capacitance variation of the first capacitor and the second capacitor, which is detected by the touch sensing circuit of the touch screen. The elements of the circuit are simple and the capacitance variation can be rapidly reflected at the output terminal. Therefore, the production cost can be lowered, and the response speed can be increased.

DETAILED DESCRIPTION OF THE EMBODIMENTS

The present disclosure will be described in detail with the following embodiments and drawings.

Figure 1:
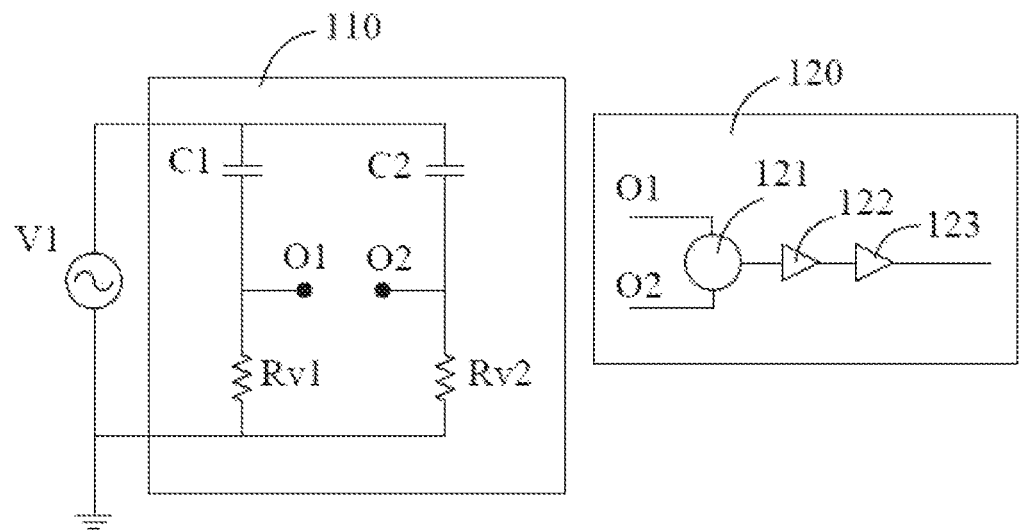
FIG. 1 is an equivalent circuit diagram of a touch sensing circuit according to a first embodiment of the present invention.

Referring to FIG. 1, a touch sensing circuit of a touch screen includes an alternative current (AC) source V1 and a voltage division circuit 110. Two terminals of the voltage division circuit 110 are connected to the AC source V1. The AC source V1 provides AC signal to the voltage division circuit 110, wherein the AC signal may be AC sine wave, AC square wave, AC sawtooth wave, AC pulse wave, and so on.

In an embodiment, the voltage division circuit 110 can process the AC signal outputted from the AC source V1. First branch of the voltage division circuit 110 includes a first capacitor C1 and a first voltage division resistor Rv1. Second branch of the voltage division circuit 110 includes a second capacitor C2 and a second voltage division resistor Rv2.

The first capacitor C1 can be defined by two Indium Tin Oxides (ITO) films of a touch sensing glass (not shown), wherein the two ITO films cross over each other and are electrically insulated from each other. When fingers contact the touch sensing glass, a part of the charge of the first capacitor C1 transfers through the fingers. Shorter the distance between the touch point and the first capacitor C1, the more the charge transfer allowing more reduction in the charge of the first capacitor C1. Furthermore, capacitance of the first capacitor C1 is in direct proportion to the distance between the touch point and the first capacitor C1.

The first voltage division resistor Rv1 may be a single resistor or multiple series-connected or parallel-connected resistors.

The second capacitor C2 can be defined by two ITO films adjacent to the two ITO films defining the first capacitor C1, wherein the two ITO films of C2 cross over each other and are electrically insulated from each other. Likewise, the capacitance of the second capacitor C2 is in direct proportion to the distance of the touch point to the second capacitor C2.

The second voltage division resistor Rv2 may be a single resistor or multiple series-connected or parallel-connected resistors. Resistance of the first voltage division resistor Rv1 is equal to that of the second voltage division resistor Rv2.

In an embodiment, the first capacitor C1 connects the first voltage division resistor Rv1 in series to form a first branch of the voltage division circuit 110, while the second capacitor C2 connects the second voltage division resistor Rv2 in series to form a second branch of the voltage division circuit 110. The first branch is in parallel to the second branch with the first capacitor C1 connected to one terminal of the second capacitor C2. The common terminal of the first capacitor C1 and the first voltage division resistor Rv1 forms a first voltage division point O1, and the common terminal of the second capacitor C2 and the second voltage division resistor Rv2 forms a second voltage division point O2. One terminal of the AC source V1 is connected to the common terminal of the first capacitor C1 and the second capacitor C2, and the other terminal of the AC source V1 is grounded. Common terminal of the first voltage division resistor Rv1 and the second voltage division resistor Rv2 is grounded. In practice, multiple branches can be set in the voltage division circuit 110 to improve the resolution of the touch screen.

In order to better observe the signals, the touch sensing circuit of the touch screen can further include a back-end processing circuit 120. The back-end processing circuit 120 includes a differential circuit 121 connected to the voltage division circuit 110, a level adjusting circuit 122 connected to the differential circuit 121, and an amplifying circuit 123 connected to the level adjusting circuit 122.

In an embodiment, a first input terminal of the differential circuit 121 can be connected to the first voltage division point O1, the second input terminal can be connected to the second voltage division point O2, and the output terminal can be connected to the input terminal of the level adjusting circuit 122. Output terminal of the level adjusting circuit 122 can be connected to input terminal of amplifying circuit 123. Output terminal of the amplifying circuit 123 can be used for outputting amplified signals.

In operation, the AC source V1 provides AC signals to the voltage division circuit 110. The AC signals make a first divided voltage on the first voltage division point O1 and make a second divided voltage on the second voltage division point O2.

When the touch sensing glass is not touched or the distance between the touch point and the first capacitor C1 is equal to the distance between the touch point and the second capacitor C2, capacitance of the first capacitor C1 is equal to that of the second capacitor C2, making the impedance of the first capacitor C1 equal to that of the second capacitor C2. Resistance of the first voltage division resistor Rv1 is equal to that of the second voltage division resistor Rv2, and the first divided voltage is equal to the second divided voltage according to the voltage division principle of the voltage division circuit 110.

When the distance of the touch point to the first capacitor C1 is less than that of the touch point to the second capacitor C2, the capacitance of the first capacitor C1 is less than that of the second capacitor C2, making the impedance of the first capacitor C1 greater than that of the second capacitor C2. In addition, resistance of the first voltage division resistor Rv1 is equal to that of the second voltage division resistor Rv2, making the first divided voltage less than the second divided voltage according to the voltage division principle of the voltage division circuit 110.

When the distance of the touch point to the first capacitor C1 is greater than that of the touch point to the second capacitor C2, capacitance of the first capacitor C1 is greater than that of the second capacitor C2, making the impedance of the first capacitor C1 less than that of the second capacitor C2. In addition, resistance of the first voltage division resistor Rv1 is equal to that of the second voltage division resistor Rv2, making the first divided voltage greater than the second divided voltage according to the voltage division principle of the voltage division circuit 110.

In an embodiment, the first divided voltage can be sent to the first input terminal of the differential circuit 121 while the second divided voltage can be sent to the second input terminal of the differential circuit 121 to perform a differential operation to get differential signals. The differential signals can be sent to the level adjusting circuit 122 to make a level adjustment to get adjusted signals. The adjusted signals can be sent to the amplifying circuit 123 to perform an amplifying operation to get amplified signals. Position of the touch point can be determined by properly processing the amplified signals, such as by manually observing or computer processing. Specifically, the back-end processing circuit 120 determines that the touch sensing glass is touched or distance of the touch point to the first capacitor C1 is equal to that of the touch point to the second capacitor C2 when the voltage of the first voltage division resistor Rv1 is equal to that of the second voltage division resistor Rv2. The back-end processing circuit 120 determines that distance of the touch point to the first capacitor C1 is less than that of the touch point to the second capacitor C2, when the voltage of the first voltage division resistor Rv1 is less than that of the second voltage division resistor Rv2. The back-end processing circuit 120 can further determine that distance of the touch point to the first capacitor C1 is greater than that of the touch point to the second capacitor C2, when the voltage of the first voltage division resistor Rv1 is greater than that of the second voltage division resistor Rv2.

Furthermore, offset of the touch point from the first capacitor C1 or the second capacitor C2 can be determined by the difference between the first divided voltage and the second divided voltage.

Figure 2:
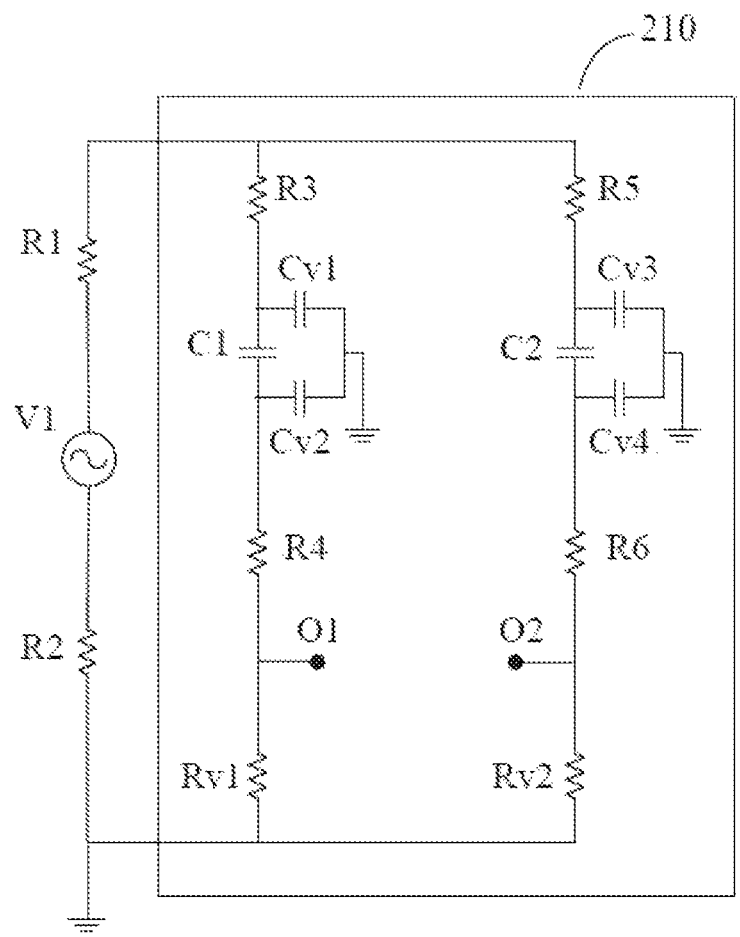
FIG. 2 is an equivalent circuit diagram of a touch sensing circuit according to a second embodiment of the present invention.
Figure 2:
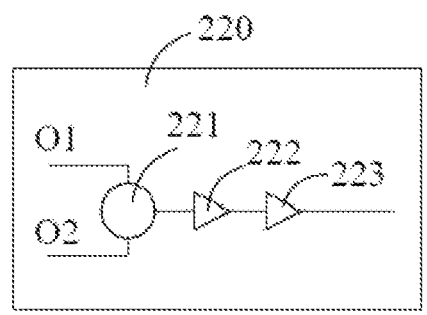

In one embodiment, the system shown in FIG. 1 is specifically illustrated in FIG. 2. The touch sensing circuit of the touch screen includes an AC source V1 and a voltage division circuit 210. Two terminals of the AC source are respectively connected to a first equalizing resistor R1 and a second equalizing resistor R2, and then are connected to the voltage division circuit 210.

The AC source V1 provides an AC signal to the voltage division circuit 210. The AC signal may be AC sine wave, AC square wave, AC sawtooth wave, AC pulse wave, and so on. The AC source V1 includes a first equalizing resistor R1 and a second equalizing resistor R2 respectively connected to two terminals of the AC source V1, wherein resistance of the first equalizing resistor R1 is equal to that of the second equalizing resistor R2.

Because of different routing, lengths of two wires of two terminals of the AC source V1 are different and therefore the resistances of the wires are also different, which cause an offset of the signals outputted from the AC source V1. Increasing the equalizing resistors on the two terminals of the AC source V1 can reduce the influence of resistance of the wires to the AC source V1 giving better symmetry of the AC signals. For instance, if the resistance of one terminal of a wire is 0.1 ohm, and the other terminal is 0.15 ohm, the tolerance rate is (1−0.1/0.15), about 33.3%. Furthermore, connecting two 110 ohm resistors to two terminals of a wire can adjust the tolerance to (1−(100+0.1)/(100+0.15)), about 0.05%.

The voltage division circuit 210 processes the AC signals outputted from the AC source V1. First branch of the voltage division circuit 210 includes a first capacitor C1, a first voltage division resistor Rv1, a third equalizing resistor R3, a fourth equalizing resistor R4, a first equalizing capacitor Cv1, and a second equalizing capacitor Cv2. Second branch of the voltage division circuit 210 includes a second capacitor C2, a second voltage division resistor Rv2, a fifth equalizing resistor R5, a sixth equalizing resistor R6, a third equalizing capacitor Cv3, and a fourth equalizing capacitor Cv4.

The first capacitor C1 can be defined by two ITO films of a touch sensing glass (not shown), wherein the two ITO films cross over each other and are electrically insulated from each other. When fingers contact the touch sensing glass, a part of the charge of the first capacitor C1 is transferred through the fingers. The shorter the distance gets between the touch point and the first capacitor C1, the more the charge transfer takes place, thereby reducing the charge of the first capacitor C1. Furthermore, capacitance of the first capacitor C1 is in direct proportion to the distance between the touch point and the first capacitor C1

The first voltage division resistor Rv1 may be a single resistor or multiple series-connected or parallel-connected resistors.

The third equalizing resistor R3 and the fourth equalizing resistor R4 have the same resistance and respectively connect to the two terminals of the first capacitor C1 to equalize the first capacitor C1.

The first equalizing capacitor Cv1 and the second equalizing capacitor Cv2 can equalize parasitic capacitors on two terminals of the first capacitor C1.

The second capacitor C2 can be defined by two other ITO films adjacent to the two ITO films defining the first capacitor C1, wherein the two ITO films of the second capacitor C2 cross over each other and are electrically insulated from each other. Likewise, capacitance of the second capacitor C2 is in direct proportion to the distance between the touch point and the second capacitor C2.

The second voltage division resistor Rv2 may be a single resistor or multiple series-connected or parallel-connected resistors.

The fifth equalizing resistor R5 and the sixth equalizing resistor R6 have the same resistance and respectively connect to the two terminals of the second capacitor C2, to equalize the second capacitor C2.

The third equalizing capacitor Cv3 and the fourth equalizing capacitor Cv4 can equalize parasitic capacitors on two terminals of the second capacitor C1.

The fourth equalizing resistor R4 is connected to the first voltage division resistor Rv1 to form the first voltage division point O1 and the sixth equalizing resistor R6 is connected to the second voltage division resistor Rv2 to form the second voltage division point O2.

In an embodiment, resistance of the first voltage division resistor Rv1 is equal to that of the second voltage division resistor Rv2.

In another embodiment, the third equalizing resistor R3, the fourth equalizing resistor R4, the fifth equalizing resistor R5, and the sixth equalizing resistor R6 have the same resistance. Because of different routing, lengths of two wires of two terminals of the first capacitor C1 and the second capacitor C2 are different and therefore the resistances of the wires are also different. According to the voltage division principle of the voltage division circuit 210, difference of the resistances causes an offset of the output voltage from the first voltage division point O1 and the second voltage division point O2, influencing the symmetry of the circuit. Therefore, increasing the equalizing resistors having same resistance on the two terminals of the first capacitor C1 and the second capacitor C2 can reduce the influence of the resistance of the wires to the voltage division circuit 210.

In another embodiment, the first equalizing capacitor Cv1, the second equalizing capacitor Cv2, the third equalizing capacitor Cv3, and the fourth equalizing capacitor Cv4 have the same capacitance. Because of different routing, lengths of two wires of two terminals of the first capacitor C1 and the second capacitor C2 are different and therefore the parasitic capacitances of the wires are also different. According to the voltage division principle of the voltage division circuit 210, difference of the parasitic capacitances causes an offset of the output voltage from the first voltage division point O1 and the second voltage division point O2, influencing the symmetry of the circuit. Therefore, increasing the equalizing capacitors having same capacitance on the two terminals of the first capacitor C1 and the second capacitor C2 can reduce the influence of the parasitic capacitance of the wires to the voltage division circuit 210.

In an embodiment, one terminal of the first equalizing resistor R1 is connected to one terminal of the third equalizing resistor R3, and the other terminal of R1 is connected to one terminal of the AC source V1. Other terminal of the AC source V1 is connected to one terminal of the second equalizing resistor R2. Other terminal of the second equalizing resistor R2 is grounded. Other terminal of the equalizing resistor R3 is connected to one terminal of the first capacitor C1 and other terminal of the first capacitor C1 is connected to one terminal of the fourth equalizing resistor R4. Other terminal of the fourth equalizing resistor R4 is connected to one terminal of the first voltage division resistor Rv1. Other terminal of the first voltage division resistor Rv1 is grounded. One terminal of the first equalizing capacitor Cv1 is connected to the common terminal of the third equalizing resistor R3 and the first capacitor C1 and the other terminal of the first equalizing capacitor Cv1 is grounded. One terminal of the second equalizing capacitor Cv2 is connected to the common terminal of the fourth equalizing resistor R4 and the first capacitor C1, and the other terminal of the second equalizing capacitor Cv2 is grounded. One terminal of the fifth equalizing resistor R5 is connected to the common terminal of the first equalizing resistor R1 and the third equalizing resistor R3, and other terminal of the fifth equalizing resistor R5 is connected to one terminal of the second capacitor C2. Other terminal of the second capacitor C2 is connected to one terminal of the sixth equalizing resistor R6 and other terminal of the sixth equalizing resistor R6 is connected to one terminal of the second voltage division resistor Rv2. Other terminal of the second voltage division resistor Rv2 is grounded. One terminal of the third equalizing capacitor Cv3 is connected to the common terminal of the fifth equalizing resistor R5 and the second capacitor C2, and other terminal is grounded. One terminal of the fourth equalizing capacitor Cv4 is connected to the common terminal of the sixth equalizing resistor R6 and the second capacitor C2, and other terminal is grounded. The voltage division circuit 210 can set multiple branches to improve the resolution of the touch screen.

In order to better observe the signals, the touch sensing circuit of the touch screen also includes a back-end processing circuit 220. The back-end processing circuit 220 includes a differential circuit 221 connected to the voltage division circuit 210, a level adjusting circuit 222 connected to the differential circuit 221, and an amplifying circuit 223 connected to the level adjusting circuit 777.

A first input terminal of the differential circuit 221 is connected to the first voltage division point O1 and the second input terminal is connected to the second voltage division point O2. Output terminal of the differential circuit 221 is connected to the input terminal of the level adjusting circuit 222. Output terminal of the level adjusting circuit 222 is connected to the input terminal of the amplifying circuit 223. Furthermore, output terminal of the amplifying circuit 223 is for outputting amplified signals.

In operation, the AC source V1 provides AC signals to the voltage division circuit 210. The AC signals make a first divided voltage on the first voltage division point O1 and make a second divided voltage on the second voltage division point O2.

When the touch sensing glass is not touched or when the distance of the touch point to the first capacitor C1 is equal to the distance of the touch point to the second capacitor C2, capacitance of the first capacitor C1 is equal to that of the second capacitor C2 and the resistance of the first voltage division resistor Rv1 is equal to that of the second voltage division resistor Rv2. In an embodiment, resistances of the third equalizing resistor R3, the fourth equalizing resistor R4, the fifth equalizing resistor R5, and the sixth equalizing resistor R6 are the same. In another embodiment, capacitances of the first equalizing capacitor Cv1 and the second equalizing capacitor Cv2 are the same. Furthermore, in yet another embodiment, capacitances of the third equalizing capacitor Cv3 and the fourth equalizing capacitor Cv4 are the same. The first divided voltage is equal to the second divided voltage according to the voltage division principle of the voltage division circuit 210.

When the distance of the touch point to the first capacitor C1 is less than that of the touch point to the second capacitor C2, capacitance of the first capacitor C1 is less than that of the second capacitor C2, making the impedance of the first capacitor C1 greater than that of the second capacitor C2. Further, in such a case, resistance of the first voltage division resistor Rv1 is equal to that of the second voltage division resistor Rv2; and resistances of the third equalizing resistor R3, the fourth equalizing resistor R4, the fifth equalizing resistor R5, and the sixth equalizing resistor R6 are the same. Capacitances of the first equalizing capacitor Cv1 and the second equalizing capacitor Cv2 are the same. Capacitances of the third equalizing capacitor Cv3 and the fourth equalizing capacitor Cv4 are the same. The first divided voltage is less than the second divided voltage according to the voltage division principle of the voltage division circuit 210.

When the distance of the touch point to the first capacitor C1 is greater than that of the touch point to the second capacitor C2, capacitance of the first capacitor C1 is greater than that of the second capacitor C2, making impedance of the first capacitor C1 lesser than that of the second capacitor C2. Resistance of the first voltage division resistor Rv1, in such a case, is equal to that of the second voltage division resistor Rv2. Furthermore, resistances of the third equalizing resistor R3, the fourth equalizing resistor R4, the fifth equalizing resistor R5, and the sixth equalizing resistor R6 are the same. Capacitances of the first equalizing capacitor Cv1 and the second equalizing capacitor Cv2 are the same. Capacitances of the third equalizing capacitor Cv3 and the fourth equalizing capacitor Cv4 are the same. The first divided voltage is greater than the second divided voltage according to the voltage division principle of the voltage division circuit 210.

The first divided voltage can be sent to the first input terminal of the differential circuit 221 while the second divided voltage can be sent to the second input terminal of the differential circuit 221 to perform a differential operation to get differential signals. The differential signals can be sent to the level adjusting circuit 222 to make a reference adjustment to get adjusted signals. The adjusted signals can then be sent to the amplifying circuit 223 to perform an amplifying operation to get amplified signals. Position of the touch point can be determined by properly processing the amplified signals such as by manually observing or computer processing.

Figure 3:
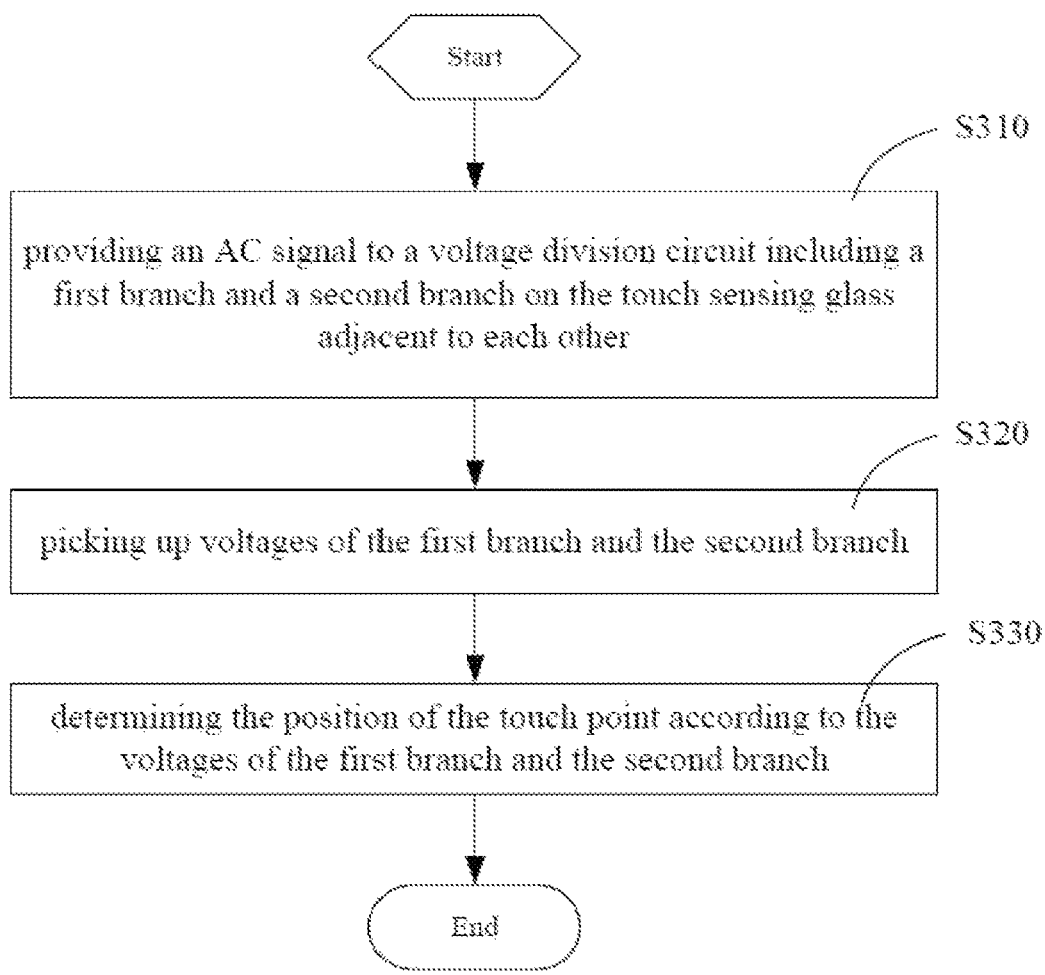
FIG. 3 is a flow chart of a touch point detecting method according to an embodiment of the present invention.

Referring to FIG. 3, a method for detecting the touch point includes following steps:

S310 provides an AC signal to a voltage division circuit, wherein the voltage division circuit includes a first branch and a second branch adjacent to each other on the touch sensing glass. The first branch includes a first capacitor and a first voltage division resistor connected to the first capacitor, and the second branch includes a second capacitor and a second voltage division resistor connected to the second capacitor.

S320 provides picking up voltages of the first branch and the second branch. Besides, step S320 further includes picking up voltages of the first voltage division resistor and the second voltage division resistor.

S330 provides determining position of the touch point according to the voltages of the first branch and the second branch. Besides, step S330 further includes determining the position of the touch point according to the voltages of the first voltage division resistor and the second voltage division resistor.

Step S330 further includes determining that the touch sensing glass is not touched or distance between the touch point and the first capacitor is equal to the distance between the touch point and the second capacitor, when the voltage of the first voltage division resistor is equal to that of the second voltage division resistor.

Step S330 further includes determining that the distance of the touch point to the first capacitor is less than that of the touch point to the second capacitor, when the voltage of the first voltage division resistor is less than that of the second voltage division resistor.

Step S330 further includes determining that distance of the touch point to the first capacitor is greater than that of the touch point to the second capacitor, when the voltage of the first voltage division resistor is greater than that of the second voltage division resistor.

Figure 4:
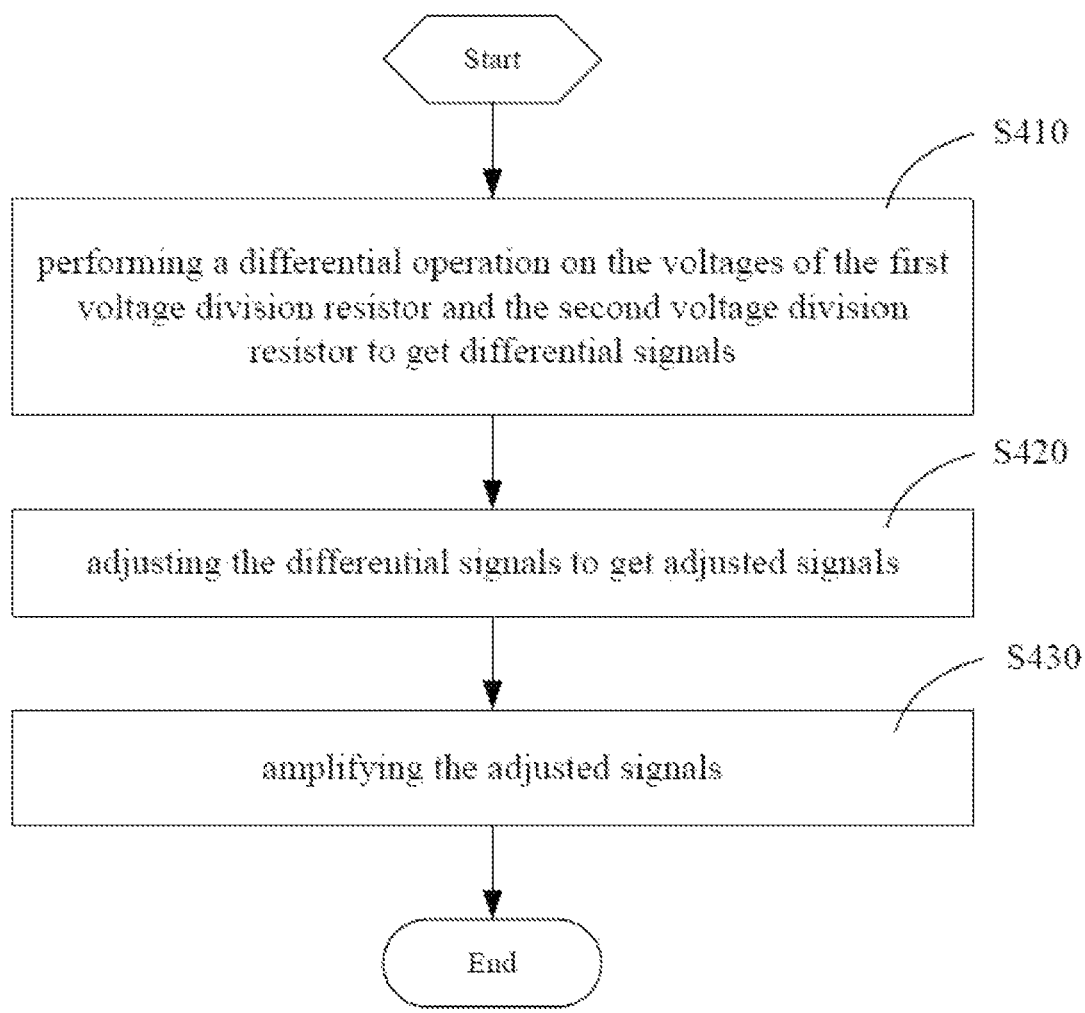
FIG. 4 is a back-end processing flow chart of a touch point detecting method according to an embodiment of the present invention.

In an embodiment, the method shown in FIG. 3 further includes back-end processing steps shown in FIG. 4.

S410 provides performing a differential operation on voltages of the first voltage division resistor and the second voltage division resistor to get differential signals.

S420 provides adjusting the differential signals to get adjusted signals.

S430 provides amplifying the adjusted signals.

Furthermore, S430 provides determining an offset of the touch point to the first capacitor or the second capacitor according to difference of the voltage of the first voltage division resistor and that of the second voltage division resistor.

By using the aforementioned detecting method of the touch sensing circuit of the touch screen, when user's finger touch the touch sensing glass of the touch screen, it attracts charges and changes the capacitance of the capacitor. Because the capacitance of the capacitor is in direct proportion to the distance of the capacitor to the touch point, the touch point can be determined according to the capacitance variation of the first capacitor and the second capacitor detected by the touch sensing circuit of the touch screen. The elements of the circuit are simple, and the capacitance variation can be rapidly reflected at the output terminal. Therefore, the production cost can be lowered, and the response speed can be increased.

Although the present invention has been described with reference to the embodiments thereof and the best modes for carrying out the present invention, it is apparent to those skilled in the art that a variety of modifications and changes may be made without departing from the scope of the present invention, which is intended to be defined by the appended claims.

What is claimed is:

1. A touch sensing circuit, comprising:
an AC source;
a voltage division circuit comprising a first branch and a second branch on a touch sensing glass, wherein the first branch and the second branch are adjacent to each other and configured to receive AC signal outputted from the AC source, and wherein the first branch comprises a first capacitor and a first voltage division resistor connected to the first capacitor, and the second branch comprises a second capacitor and a second voltage division resistor connected to the second capacitor;
a processing circuit connected to the voltage division circuit, wherein the processing circuit determines position of a touch point based on voltages of the first branch and the second branch; and
a first equalizing resistor, a second equalizing resistor, a third equalizing resistor, a fourth equalizing resistor, a fifth equalizing resistor, and a sixth equalizing resistor, a first equalizing capacitor, a second equalizing capacitor, a third equalizing capacitor and a fourth equalizing capacitor, wherein one terminal of the first equalizing resistor is connected to one terminal of the third equalizing resistor, other terminal of the first equalizing resistor is connected to one terminal of the AC source, other terminal of the AC source is connected to one terminal of the second equalizing resistor, other terminal of the second equalizing resistor is grounded, other terminal of the third equalizing resistor is connected to one terminal of the first capacitor, other terminal of the first capacitor is connected to one terminal of the fourth equalizing resistor, other terminal of the fourth equalizing is connected to one terminal of the first voltage division resistor, other terminal of the first voltage division resistor is grounded, one terminal of the first equalizing capacitor is connected to the common terminal of the third equalizing resistor and the first capacitor, other terminal of the first equalizing capacitor is grounded, one terminal of the second equalizing capacitor is connected to the common terminal of the fourth equalizing resistor and the first capacitor, other terminal of the second equalizing capacitor is grounded, one terminal of the fifth equalizing resistor is connected to the common terminal of the first equalizing resistor and the third equalizing resistor, other terminal is connected to one terminal of the second capacitor, other terminal of the second capacitor is connected to one terminal of the sixth equalizing resistor, other terminal of the sixth equalizing resistor is connected to one terminal of the second voltage division resistor, other terminal of the second voltage division resistor is grounded, one terminal of the third equalizing capacitor is connected to the common terminal of the fifth equalizing resistor and the second capacitor, other terminal of the third equalizing capacitor is grounded, one terminal of the fourth equalizing capacitor is connected to the common terminal of the sixth equalizing resistor and the second capacitor, and other terminal of the fourth equalizing capacitor is grounded.

2. The touch sensing circuit of claim 1, wherein the resistance of the first voltage division resistor is equal to resistance of the second voltage division resistor.

3. The touch sensing circuit of claim 2, wherein each of the first capacitor and the second capacitor are composed of two ITO films of the touch sensing glass, wherein the two ITO films of each of the first capacitor and the second capacitor cross over each other and are electrically insulated from each other.

4. The touch sensing circuit of claim 2, wherein capacitance of the first capacitor is directly proportional to distance of touch point to the first capacitor and capacitance of the second capacitor is directly proportional to distance of touch point to the second capacitor.

5. The touch sensing circuit of claim 2, wherein the first equalizing resistor and the second equalizing resistor have the same resistance.

6. The touch sensing circuit of claim 2, wherein resistances of the third equalizing resistor, the fourth equalizing resistor, the fifth equalizing resistor, and the sixth equalizing resistor are equal.

7. The touch sensing circuit of claim 2, wherein the first equalizing capacitor and the second equalizing capacitor have the same capacitance, and the third equalizing capacitor and the fourth equalizing capacitor have the same capacitance.

8. The touch sensing circuit of claim 2, wherein the processing circuit comprises a differential circuit connected to the voltage division circuit for getting voltages of the first voltage division resistor and the second voltage division resistor, a level adjusting circuit connected to the differential circuit, and an amplifying circuit connected to the level adjusting circuit.

9. The touch sensing circuit of claim 2, wherein the processing circuit determines that the touch sensing glass is not touched or distance of the touch point to the first capacitor is equal to the distance of the touch point to the second capacitor when the voltage of the first voltage division resistor is equal to that of the second voltage division resistor; further wherein the processing circuit determines that distance of the touch point to the first capacitor is less than that of the touch point to the second capacitor when voltage of the first voltage division resistor is less than voltage of the second voltage division resistor; further wherein the processing circuit determines that distance of the touch point to the first capacitor is greater than the distance of the touch point to the second capacitor when voltage of the first voltage division resistor is greater than the voltage of the second voltage division resistor.

10. The touch sensing circuit of claim 2, wherein the processing circuit determines an offset of a touch point to the first capacitor or the second capacitor based on the difference of voltage of the first voltage division resistor and voltage of the second voltage division resistor.

11. A method for detecting a touch point of a touch sensing glass, comprising:
   a) providing an AC signal to a voltage division circuit, wherein the voltage division circuit comprises a first branch and a second branch on the touch sensing glass, and the first branch comprises a first capacitor and a first voltage division resistor connected to the first capacitor, and the second branch comprises a second capacitor and a second voltage division resistor connected to the second capacitor;
   wherein the voltage division circuit further comprises a first equalizing resistor, a second equalizing resistor, a third equalizing resistor, a fourth equalizing resistor, a fifth equalizing resistor, and a sixth equalizing resistor, a first equalizing capacitor, a second equalizing capacitor, a third equalizing capacitor and a fourth equalizing capacitor, wherein one terminal of the first equalizing resistor is connected to one terminal of the third equalizing resistor, other terminal of the first equalizing resistor is connected to one terminal of the AC source, other terminal of the AC source is connected to one terminal of the second equalizing resistor, other terminal of the second equalizing resistor is grounded, other terminal of the third equalizing resistor is connected to one terminal of the first capacitor, other terminal of the first capacitor is connected to one terminal of the fourth equalizing resistor, other terminal of the fourth equalizing is connected to one terminal of the first voltage division resistor, other terminal of the first voltage division resistor is grounded, one terminal of the first equalizing capacitor is connected to the common terminal of the third equalizing resistor and the first capacitor, other terminal of the first equalizing capacitor is grounded, one terminal of the second equalizing capacitor is connected to the common terminal of the fourth equalizing resistor and the first capacitor, other terminal of the second equalizing capacitor is grounded, one terminal of the fifth equalizing resistor is connected to the common terminal of the first equalizing resistor and the third equalizing resistor, other terminal is connected to one terminal of the second capacitor, other terminal of the second capacitor is connected to one terminal of the sixth equalizing resistor, other terminal of the sixth equalizing resistor is connected to one terminal of the second voltage division resistor, other terminal of the second voltage division resistor is grounded, one terminal of the third equalizing capacitor is connected to the common terminal of the fifth equalizing resistor and the second capacitor, other terminal of the third equalizing capacitor is grounded, one terminal of the fourth equalizing capacitor is connected to the common terminal of the sixth equalizing resistor and the second capacitor, and other terminal of the fourth equalizing capacitor is grounded;
   b) picking up voltages of the first branch and the second branch; and
   c) determining position of the touch point based on voltages of the first branch and the second branch.

12. The method of claim 11, wherein resistance of the first voltage division resistor is equal to resistance of the second voltage division resistor, and
   step b) further comprises a step d) for picking up voltages of the first voltage division resistor and the second voltage division resistor; and
   step c) further comprises a step e) for determining the position of the touch point based on voltages of the first voltage division resistor and the second voltage division resistor.

13. The method of claim 12, wherein step e) further comprises:
   step f) for performing a differential operation on the voltages of the first voltage division resistor and the second voltage division resistor to get differential signals;
   step g) for adjusting the differential signals to get adjusted signals; and
   step h) for amplifying the adjusted signals.

14. The method of claim 12, wherein step e) further comprises:
   step i) for determining that the touch sensing glass is not touched, or distance of the touch point to the first capacitor is equal to distance of the touch point to the second capacitor when voltage of the first voltage division resistor is equal to voltage of the second voltage division resistor;
   determining that distance of the touch point to the first capacitor is less than distance of the touch point to the second capacitor when voltage of the first voltage division resistor is less than voltage of the second voltage division resistor; and
   step j for determining that distance of the touch point to the first capacitor is greater than distance of the touch point to the second capacitor when voltage of the first voltage division resistor is greater than voltage of the second voltage division resistor.

15. The method of claim 12, wherein step e) further comprises:
   step k) for determining offset of the touch point to the first capacitor or the second capacitor based on difference of voltage of the first voltage division resistor and voltage of the second voltage division resistor.

16. The method of claim 12, wherein the first equalizing resistor and the second equalizing resistor have the same resistance.

17. The method of claim 12, wherein resistances of the third equalizing resistor, the fourth equalizing resistor, the fifth equalizing resistor, and the sixth equalizing resistor are equal.

18. The method of claim 12, wherein the first equalizing capacitor and the second equalizing capacitor have the same capacitance, and the third equalizing capacitor and the fourth equalizing capacitor have the same capacitance.

* * * * *